(12) United States Patent
Kamino

(10) Patent No.: US 7,870,510 B2
(45) Date of Patent: Jan. 11, 2011

(54) METHOD AND APPARATUS FOR GENERATING AND MANAGING PARTS-CONFIGURATION INFORMATION

(75) Inventor: Toshihiro Kamino, Osaka (JP)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 11/748,605

(22) Filed: May 15, 2007

(65) Prior Publication Data

US 2007/0214433 A1 Sep. 13, 2007

Related U.S. Application Data

(62) Division of application No. 10/289,930, filed on Nov. 7, 2002, now Pat. No. 7,266,784.

(30) Foreign Application Priority Data

Nov. 12, 2001 (JP) ............................. 2001-346570

(51) Int. Cl.
G06F 3/00 (2006.01)
(52) U.S. Cl. ..................................... 715/853
(58) Field of Classification Search ................. 715/771, 715/853
See application file for complete search history.

(56) References Cited

U.S. PATENT DOCUMENTS 5,283,865 A 2/1994 Johnson
5,777,877 A * 7/1998 Beppu et al. .................. 700/97
5,806,069 A 9/1998 Wakiyama et al.
6,557,002 B1 4/2003 Fujieda et al.
2002/0026385 A1 2/2002 McCloskey et al.
2002/0059283 A1 5/2002 Shapiro et al.

FOREIGN PATENT DOCUMENTS

| EP | 0467257 A2 | 1/1992 |
| JP | PUPA02-136976 | 5/1990 |
| JP | PUPA2000-148814 | 5/2000 |
| JP | PUPA2001-282879 | 10/2001 |

OTHER PUBLICATIONS

Boyce, Jim; Microsoft® Windows NT® Workstation 4.0 User Manual, Feb. 1999, Que pp. i-iv, 8-9, 11-13, 17-18, 23, 38-40, 43-46, 49, 51-53, 59-62, 64-66, 68-72, 183, 190, 417-419 and 428-431.

* cited by examiner

Primary Examiner—Ryan F Pitaro
(74) Attorney, Agent, or Firm—Schmeiser, Olsen & Watts; William H. Steinberg

(57) ABSTRACT

An information output device, an information display device, and an information management system for the efficient management of the parts of an industrial product. Information about the parts constituting the product is included in a table at the engineering stage. In the subsequent production stage or service stage, information may be added or altered when some of the parts are aggregated as an assembly or a set. A section is provided in the tables for each of the parts constituting the product according to a plurality of display modes, so that part configuration information such as part configuration diagrams needed in engineering, production, and service may be displayed as trees.

20 Claims, 8 Drawing Sheets

| Part number | Parent part | Level | Name of part | Number of part | EPS section | Functional engineering | Production engineering | Service part |
|---|---|---|---|---|---|---|---|---|
| A101 | X001 | 1 | Cylinder block | 1 | E P S | | | |
| B201 | X001 | 1 | Cylinder head | 1 | E P S | | | |
| C301 | X001 | 1 | Oil pan | 1 | E P S | | | |
| D401 | X001 | 1 | Piston | 4 | E ⊠ S | | | |
| D411 | D401 | 2 | Piston ring A | 1 | E ⊠ S | | | |
| D412 | D401 | 2 | Piston ring B | 2 | E ⊠ S | 2 | | |
| E501 | X001 | 1 | Crank | 1 | E P S | | | |
| F601 | X001 | 1 | Starting Motor Assy | 1 | E P S | | Purchase | |
| P401 | X001 | 1 | Piston Assy | 4 | P | | Intermediate part | |
| D401 | P401 | 2 | Piston | 1 | P | | Component | |
| D411 | P401 | 2 | Piston ring A | 1 | P | | Component | |
| D412 | P401 | 2 | Piston ring B | 2 | P | | Component | |

FIG. 2

| Part number | Parent part | Level | Name of part | Number of part | EPS section | Functional engineering | Production engineering | Service part |
|---|---|---|---|---|---|---|---|---|
| A101 | X001 | 1 | Cylinder block | 1 | E ¦ P ¦ S | | | |
| B201 | X001 | 1 | Cylinder head | 1 | E ¦ P ¦ S | | | |
| C301 | X001 | 1 | Oil pan | 1 | E ¦ P ¦ S | | | |
| D401 | X001 | 1 | Piston | 4 | E ¦ P ¦ S | | | |
| D411 | D401 | 2 | Piston ring A | 1 | E ¦ P ¦ S | | | |
| D412 | D401 | 2 | Piston ring B | 2 | E ¦ P ¦ S | | | |
| E501 | X001 | 1 | Crank | 1 | E ¦ P ¦ S | | | |
| F601 | X001 | 1 | Starting Motor Assy | 1 | E ¦ P ¦ S | | Purchase | |

| Part number | Parent part | Level | Name of part | Number of part | EPS section | Functional engineering | Production engineering | Service part |
|---|---|---|---|---|---|---|---|---|
| A101 | X001 | 1 | Cylinder block | 1 | E\|P\|S | | | |
| B201 | X001 | 1 | Cylinder head | 1 | E\|P\|S | | | |
| C301 | X001 | 1 | Oil pan | 1 | E\|P\|S | | | |
| D401 | X001 | 1 | Piston | 4 | E\|X\|S | | | |
| D411 | D401 | 2 | Piston ring A | 1 | E\|X\|S | | | |
| D412 | D401 | 2 | Piston ring B | 2 | E\|X\|S | | | |
| E501 | X001 | 1 | Crank | 1 | E\|P\|S | | | |
| F601 | X001 | 1 | Starting Motor Assy | 1 | E\|P\|S | | Purchase | |
| P401 | X001 | 1 | Piston Assy | 4 | \|P\| | | Intermediate part | |
| D401 | P401 | 2 | Piston | 1 | \|P\| | | Component | |
| D411 | P401 | 2 | Piston ring A | 1 | \|P\| | | Component | |
| D412 | P401 | 2 | Piston ring B | 2 | \|P\| | | Component | |

| Part number | Parent part | Level | Name of part | Number of part | EPS section | Functional engineering | Production engineering | Service part |
|---|---|---|---|---|---|---|---|---|
| A101 | X001 | 1 | Cylinder block | 1 | E P S | | | |
| B201 | X001 | 1 | Cylinder head | 1 | E P S | | | |
| C301 | X001 | 1 | Oil pan | 1 | E P S | | | |
| D401 | X001 | 1 | Piston | 4 | E ~~P~~ ~~S~~ | 4 | | |
| D411 | D401 | 2 | Piston ring A | 1 | E ~~P~~ ~~S~~ | | | |
| D412 | D401 | 2 | Piston ring B | 2 | E ~~P~~ ~~S~~ | | | |
| E501 | X001 | 1 | Crank | 1 | E P S | | | |
| F601 | X001 | 1 | Starting Motor Assy | 1 | E ~~P~~ ~~S~~ | | | |
| | | | | | | | | |
| P401 | X001 | 1 | Piston Assy | 4 | P | | Intermediate part | |
| D401 | P401 | 2 | Piston | 1 | P | | Component | |
| D411 | P401 | 2 | Piston ring A | 1 | P | | Component | |
| D412 | P401 | 2 | Piston ring B | 2 | P | | Component | |
| | | | | | | | | |
| S401 | X001 | 1 | Piston kit | 1 | S | | | Set-sales part |
| D401 | S401 | 2 | Piston | 1 | S | | | Unit-sales part |
| S402 | S401 | 2 | Piston ring set | 1 | S | | | Set-sales part |
| D411 | S402 | 3 | Piston ring A | 1 | S | | | Component |
| D412 | S402 | 3 | Piston ring B | 2 | S | | | Component |
| F601 | X001 | 1 | Starting Motor Assy | 1 | S | | Purchase | |
| S601 | F601 | 2 | Starting Motor | 1 | S | | | Service part sales code |
| S602 | F601 | 2 | Brush | 1 | S | | | Service part sales code |

FIG. 5

| Part number | Parent part | Level | Name of part | Number of part | EPS section | From | To | State flag | Functional engineering | Production engineering | Service part |
|---|---|---|---|---|---|---|---|---|---|---|---|
| A101 | X001 | 1 | Cylinder block | 1 | E,P,S | | | Effective | | | |
| B201 | X001 | 1 | Cylinder head | 1 | E,P,S | | | Effective | | | |
| C301 | X001 | 1 | Oil pan | 1 | E,P,S | | | Effective | | | |
| D401 | X001 | 1 | Piston | 4 | E,I | | | Effective | | | |
| D411 | D401 | 2 | Piston ring A | 1 | E,I | | 2001/10/31 | Ineffective | | | |
| D413 | D401 | 2 | Piston ring A | 1 | E,I | 2001/11/1 | | Effective | | | |
| D412 | D401 | 2 | Piston ring B | 2 | E,I | | | Effective | | | |
| E501 | X001 | 1 | Crank | 1 | E,P,S | | | Effective | | | |
| F601 | X001 | 1 | Starting Motor Assy | 1 | E,P,I | | | Effective | | Purchase | |
| P401 | X001 | 1 | Piston Assy | 4 | P,I | | | Effective | | Intermediate part | |
| D401 | P401 | 2 | Piston | 1 | P,I | | | Effective | | Component | |
| D411 | P401 | 2 | Piston ring A | 1 | P,I | | 2001/11/8 | Effective | | Component | |
| D413 | P401 | 2 | Piston ring A | 1 | P,I | 2001/11/9 | | Ineffective | | Component | |
| D412 | P401 | 2 | Piston ring B | 2 | P,I | | | Effective | | Component | |
| S401 | X001 | 1 | Piston kit | 1 | I,S | | | Effective | | | Set-sales part |
| D401 | S401 | 2 | Piston | 1 | I,S | | | Effective | | | Unit-sales part |
| S402 | S401 | 2 | Piston ring set | 1 | I,S | | | Effective | | | Set-sales part |
| D411 | S402 | 3 | Piston ring A | 1 | I,S | | 2001/11/20 | Effective | | Component | |
| D413 | D401 | 2 | Piston ring A | 1 | I,S | 2001/11/21 | | Ineffective | | Component | |
| D412 | S402 | 3 | Piston ring B | 2 | I,S | | | Effective | | Component | |
| F601 | X001 | 1 | Staring Motor Assy | 1 | I,S | | | Effective | | | |
| S601 | F601 | 2 | Starting Motor | 1 | I,S | | | Effective | | Purchase | Service part sales code |
| S602 | F601 | 2 | Brush | 1 | I,S | | | Effective | | | Service part sales code |

500

METHOD AND APPARATUS FOR GENERATING AND MANAGING PARTS-CONFIGURATION INFORMATION

Divisional application of Ser. No. 10/289,930, filed Nov. 7, 2002.

FIELD OF THE INVENTION

The present invention relates to methods and apparatus for generating and managing information such as parts configurations of assembled products.

BACKGROUND

Numerous industrial products such as automobiles and computers are made by combining parts. Such products are engineered in view of various measures such as cost, performance, and ease of assembly or maintenance. With regard to the parts constituting the products, information such as their names, required numbers and the like are often described in a part configuration diagram or table.

Subassemblies may be used to simplify the production of such products. For example, in the case of an automobile engine, not all parts are assembled from scratch on an engine assembly line. Subassemblies such as pistons that have been previously fitted with piston rings, starting motors that have been previously assembled from parts such as brushes, frames, and the like, may be installed on the engine production line. In such cases, part configuration diagrams for the subassemblies may be separate from the part configuration diagram of the final product.

In addition, replacement parts are sold for such products. Some parts of the final product, such as expendables, are treated as single units, whereas other parts are treated as subassemblies because of the difficulty of disassembly and assembly that make finer-level repair prohibitively difficult.

For example, piston rings are commonly installed on pistons and sold as a set. In the case of a starting motor, either a brush by itself or an entire starting motor may be provided, as the expendable brush may be changed without requiring replacement of the entire motor. Thus the brush and the entire motor may have separate part numbers, and separate configuration diagrams may be needed.

As described above, units of a product may be different at the engineering stage, the production stage, and the service stage. Therefore, it is necessary to produce part configuration diagrams and the like to be used at each stage individually. This need hinders efficient product development.

After a product is developed, managing the multitude of part configuration diagrams is a troublesome effort. For example, when a part is changed, the change must be reflected throughout the related set of configuration diagrams and throughout the various stages of engineering, production, and service.

Thus there is a need for an information management system that improves the efficiency with which such configuration diagrams may be generated, changed, and used.

SUMMARY

An information output device according to the invention stores attribute information for a plurality of display modes for parts constituting a product in an information storage unit. An image output control unit outputs an image indicative of a part configuration of the product in a particular display mode, based on the attribute information. Display modes include, for example, the part configuration at the engineering stage of the product, the part configuration at the production stage, and the part configuration at the service stage, from which the image indicative of the part configuration is output in a designated display mode.

For the attribute information, aggregation-specifying information may be used for each of the parts, in order to specify a part aggregation such as an assembly, a part-set, or the like. The image output control unit may specify a hierarchical structure of the parts constituting the product, based on the aggregation specifying information, and output a treelike image, based on level information indicative of a level in a treelike image set for each of the parts.

In addition, the image indicative of the part configuration may be displayed on the information output device itself, or it may be configured so that the image is displayed on another display unit connected through a network.

The present invention includes an information display device for displaying an element aggregation comprising a plurality of components which are not necessarily the parts. The information display device may display an organization chart corresponding to each of a plurality of organizational forms which are different from one another in the same element aggregation. Moreover, the organization chart of the organization form, whose designation is accepted on designation-acceptance means that receive external input, may be displayed.

The information display device may use data graphs for displaying organization charts corresponding to each of the organizational forms, which may be different from one another in the same element aggregation. The graph data may include information for specifying the plurality of components constituting the element aggregation, in each of the plurality of organizational forms.

The graph data may also be received from an external database through the network. In this case, the information display device serves a client of a host. Furthermore, the information display device may comprise storage means for the graph data, and in this case, the information display device may itself include the necessary functions. The information display device may also include means for altering the graph data in order to alter the organization chart of a particular organizational form.

The components or the element aggregations which handle the information are not limited to the parts, or to the product composed of the parts, or to the assembly, and so forth; rather, they may be anything wherein the same element aggregation may have similar organizational forms. For example, they are applicable to personnel organizations and the like.

The present invention includes an information management system comprising: a host for controlling input and output of data to a database; and a client accessible to the host through a network that stores the information in the database for forming the organization chart of the plurality of parts constituting the part aggregation in the plurality of modes. When the client accepts the designation of the mode for the organization chart, the organization chart of the parts in the designated mode is output based on the information transferred from the host in response to a request from the client.

More specifically, the database associates and stores the aggregation-specifying information for specifying the part aggregation which the parts belong to, and index information for specifying the mode in which the aggregation specifying information is effective. The host, in response to the request from the client, extracts the aggregation specifying information that is to be effective in the designated mode, based on the index information, and transfers the extracted information to the client. The client outputs the organization chart in the designated mode by specifying the aggregation which each of the parts belongs to, based on the aggregation-specifying information transferred from the host.

The client also may read the information stored in the database through the host, and edit the information based on external input. Then the information edited in the client is reflected in the information stored in the database through the host.

An information management method according to the invention accepts the designation of a part aggregation which parts belong to in each of the plurality of modes, and then associates and stores mode-identification information for identifying the mode, and the aggregation specifying information for specifying the part aggregation which the parts belong to in the identified mode. After storing the aggregation specifying information of the parts in each of the modes, when the designation of the mode of the information to be output is externally accepted, the aggregation specifying information is extracted associated with the mode identification information corresponding to the designated mode. Then the tree diagram indicative of a relation among the parts constituting the part aggregation is displayed, based on the extracted aggregation specifying information. Thus, the tree diagram indicative of the relation between the part aggregation and the parts constituting the same product may be displayed in the plurality of modes.

The present invention also includes a computer-readable recording medium having part-configuration management data recorded therein. In this case, the part-configuration management data is recorded in a management file formed in the recording medium. The management file comprises an attribute information region having recorded attribute information for associating the parts constituting the product with the part aggregation which the parts belong to, and a mode information region having recorded mode information for indicating the mode in which the attribute information is effective. When a particular mode is designated in order to display the organizational structure of the parts, the mode information indicates the attribution information to be effective in the mode.

When the computer reads such part configuration management data from the recording medium and the particular mode is designated by external input, the computer may refer to the mode information in the mode information region and specify the attribute information to be effective in the designated mode. Then the computer may obtain the specified attribute information, that is, the information of the parts and the part aggregation with which the parts are assigned, and form the organization chart of the parts constituting the product based on the information.

The present invention also includes a program for causing a computer device to perform processes of reading the information for forming the organization chart of the parts constituting the part aggregation in the plurality of modes, from the database, and extracting and outputting the information of the organization chart corresponding to the particular mode from the information read. Then, the process of reading the information may comprise reading the mode identification information, and the aggregation-specifying information for specifying the part aggregation which the parts belong to in that mode. The process of extracting and outputting the information may comprise extracting the aggregation-specifying information associated with the mode identification information corresponding to the designated mode.

BRIEF DESCRIPTION OF THE DRAWINGS

FIG. 2 shows an example of a table with information input in an engineering department;

FIG. 3 shows an example of the table with the information input in a production department;

FIG. 4 shows an example of the table with the information input in a service department;

FIG. 5 shows an example of the table with additional information about an engineering alteration;

DETAILED DESCRIPTION

The present invention will be described below in detail based on a preferred embodiment shown in the accompanying drawings.

Figure 1:
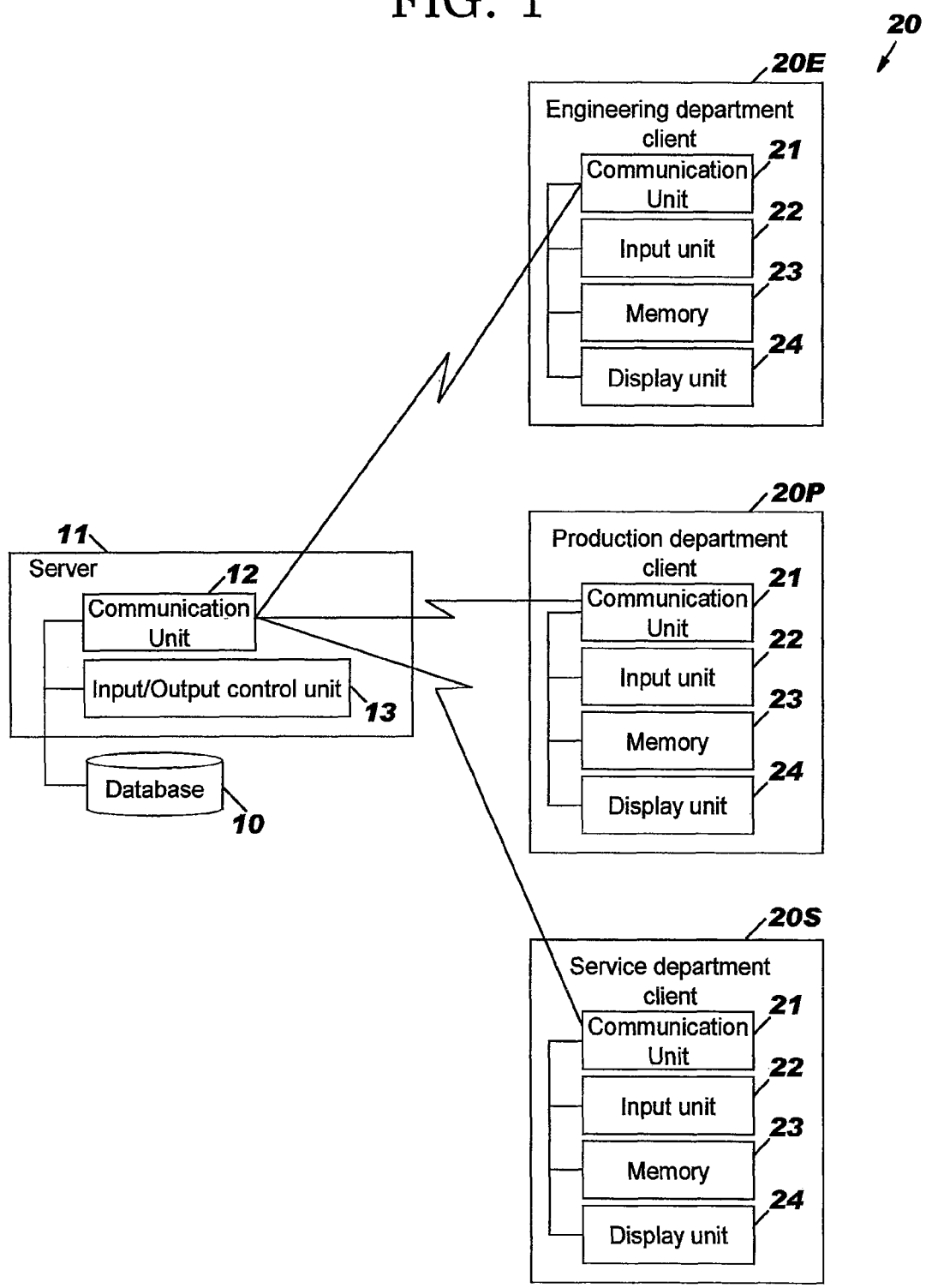
FIG. 1 shows a configuration of a product structure information management system according to the invention.

FIG. 1 illustrates an exemplary configuration of a product structure information management system according to the invention. As shown in FIG. 1, the product structure information management system comprises a server (an information output device, a host device, a computer and a computer device) 11 having a database (an information storage unit) 10, and a plurality of clients (an information display device and a client device) 20E, 20P, 20S connectable to the server 11 through a network such as a LAN, the Internet, or the like. For descriptive convenience, the clients 20E, 20P, and 20S may be referred to as the clients 20.

The server 11 has a communication unit 12 in communication with the clients 20 through the network, and an input/output control unit (an image output control unit) 13 for controlling input and output of data with respect to the database 10. The server 11 stores (inputs) the data in the database 10, or outputs based on the data stored in the database 10, in response to requests from the clients 20.

The clients 20 each comprise a communication unit 21 in communication with the server 11 through the network, an input unit (designation acceptance means) 22 having a keyboard, a mouse, or the like, which a user operates to input/output desired data or other information, a memory (storage means) 23 for temporarily storing the data transferred from the database 10, and a display unit (display means) 24 for outputting based on the data stored in the memory 23.

According to the invention, the clients 20 are assigned to an engineering department, a production department, and a service department, respectively, which are an engineering department client 20E, a production department client 20P and a service department client 20S, respectively, in the following description.

In the product structure information management system as described above, information about all of its parts (components) constituting the product (a part aggregation and an element aggregation) may be input at the input unit 22 of the engineering department client 20E when a product is engineered in the engineering department.

FIG. 2 is an example of a table 200 (graph data and part configuration management data) showing the information input as described above. The table 200 is recorded in a management file formed in the database 10. The information included in the table is controlled by the input/output control unit 13.

The information input in the engineering department client 20E may include part numbers given to each of the parts, in addition to a name of the parts constituting the product. Information indicative of a mutual relation which may be hierarchical among the parts, for example a part number of a parent part indicative of the part or the product which the parts belong to, and the information of a level which the parts belong to, may also be recoded in an attribute information region of the management file. The level which a part belongs to indicates a layer which the part belongs to, for example as level information of "1", "2", "3" and the like, when the level of the product is set as "0". That is, if the part or an assembly constituting the product is level "1", the parts constituting the part or the assembly of the level "1" are set as the level "2", and the parts constituting the part or the assembly of the level "2" are set as the level "3", and so on. A hierarchical structure of each of the parts may be shown in an organization chart as a treelike image, i.e., an image having a logical tree structure, in order to show a part configuration of the product based on the level information.

In addition, for each of the parts, an EPS section as index information, which may also be called mode identification information or mode information, is recorded in a mode information region of the management file of the table. The mode information is used to denote the information of the engineering department, the production department, and the service department. That is, "E" for information regarding parts used in the engineering department, "P" for information regarding parts used in the production department, and "S" for information regarding parts used in the service department, are given as the index information. This EPS section may be set when table information is produced or edited in the engineering department client 20E, the production department client 20P, and the service department client 20S.

A concrete example shown in FIG. 2 will be described. In this table showing the part configuration of an engine unit X001, a cylinder block A101, a cylinder head B201, an oil pan C301, a piston D401, a crank E501, and a starting motor assembly (referred to as "Assy" in the FIG. 2) F601 are shown as the parts of the level "1" whose parent parts are the engine unit X001. Since a piston ring A, D411, and a piston ring B, D412, are to be attached on each of the four pistons D401, they are shown as the parts of the level "2" whose parent parts are the piston D401.

The information input into the table by operations in the engineering department client 20E as described above is received at the communication unit 12 of the server 11 through the network from the communication unit 21. Then the input/output control unit 13 of the server 11 stores the received information in the database 10.

In the production department client 20P, an operator considers productivity or part procurement and the like in a production process, and adds or alters the information in the table in a state as shown in FIG. 2 at the point, by input from the input unit 22.

For example, if a plurality of parts from the parts listed in the table produced in the engineering department are assembled as the assembly, the information of the assembly itself is added to the table and the information of the relation between this assembly and the parts constituting the assembly is included in the table.

In the table 300 shown in FIG. 3, the information has been added or altered from the position of the production department. Here, a piston assembly P401 composed of the piston D401, the piston ring A, D411, and the piston ring B, D412, is previously assembled, to be used in production of the engine unit X001. Then, a new part set to be used in the production department, in this case the piston assembly P401, is given a new part number produced here. Then, even if the same parts (the piston D401, the piston ring A, D411 and the piston ring B, D412, in this case) are altered in their parent parts or child parts, the information of the parts, e.g., a row of the table describing it, is newly added.

For the information about the piston assembly P401, the part number of its parent part, which is the engine unit X001 in this case, includes the level which the parts belong to. For the piston D401, the piston ring A, D411, and the piston ring B, D412, which constitute the piston assembly P401, the part number of the piston assembly P401 as their parent and the level information which are altered due to the assembly are included.

Then, since the parts from which the information was added or altered have been provisionally given the EPS sections in the engineering department, they are corrected.

In the example shown in FIG. 3, since the piston assembly P401 is newly provided, the piston D401, the piston ring A, D411, and the piston ring B, D412, are to be added or altered. The piston D401, the piston ring A, D411, and the piston ring B, D412, which constitute the piston assembly P401 to be used in the production department, are given "P" in their EPS sections, as shown with a sign (1) in FIG. 3.

Accordingly, for the parts from which the information was altered, that is, the piston D401, the piston ring A, D411, and the piston ring B, D412, "P" is deleted from their EPS sections which have been provisionally given in the engineering department when the table was produced, as shown with a sign (2) in FIG. 3.

In addition, when the EPS section is corrected as described above, the information about that part, for example the row of the table describing it, will not be deleted unless any of "E", "P" and "S" remains in the section.

The information input into the table by the operations in the production department client 20P as described above are received in the communication unit 12 of the server 11 through the network from the communication unit 21. Then the input/output control unit 13 of the server 11 stores the received information in the database 10 to overwrite the original information.

In the service department client 20S, the operator considers productivity, cost, maintenance, and adds or alters the information in the table in the state as shown in FIG. 3 by inputting from the input unit 22.

For example, if the plurality of parts are assembled to provide an assembly, the information about the assembly itself is added to the table. Furthermore, if the plurality of parts are exchanged at the same time due to the functions of the parts, the information is added for those plurality of parts as a set. Then, since there is a case where the part consisting of the assembly or the set is provided as a single unit, the information of the part as a single unit also needs to have been set in the table.

In the table 400 shown in FIG. 4, the information has been added or altered from the position of the service department. Here, a piston kit S401 is a set which includes the piston D401, the piston ring A, D411, and the piston ring B, D412. A piston ring set S402 is set that includes the piston ring A, D411, and the piston ring B, D412; and the piston kit S401 is a set that includes the piston ring set S402 and the piston D401.

Continuing with the example illustrated by FIG. 4, for a starting motor assembly F601, the product, which has been previously produced by a starting motor manufacturer, has been purchased at an engineering stage and a production stage, which is denoted as "Purchase" in the table of FIG. 4. However, at a service stage, in order to maintain the function of the starting motor, it may be necessary to exchange only a brush S602 constituting the starting motor assembly F601. Accordingly, not only the starting motor assembly F601, but also a starting motor S601 and the brush S602 are set as the parts for the service.

Then, for the piston D401, the piston ring A, D411, the piston ring B, D412, the piston kit S401, the piston ring set S402, the starting motor assembly F601, the starting motor S601, and the brush S602, which have been altered in their settings as described above, the part numbers of their parent parts, the levels which the parts belong to, and the like, are included respectively.

Also, the EPS sections provisionally given in the engineering department are corrected for the parts for which the information was added or altered.

In the example shown in FIG. 4, the piston D401, the piston ring A, D411, and the piston ring B, D412, the piston kit S401, the piston ring set S402, the starting motor assembly F601, the starting motor S601, and the brush S602, which have been altered in their settings for the service department, are given "S" in their EPS sections, as shown with a sign (3) in FIG. 4.

Accordingly, for the parts for which the information was altered, that is, the piston D401, the piston ring A, D411, and the piston ring B, D412, and the starting motor assembly F601, "S" are deleted from their EPS sections which have been provisionally given in the engineering department when the table was produced, as shown with a sign (4) in FIG. 4.

The information input into the table by the operations in the service department client 20S as described above is received in the communication unit 12 of the server 11 through the network from the communication unit 21. Then the input/output control unit 13 of the server 11 stores the received information in the database 10 to overwrite the original information.

FIG. 5 illustrates the resultant table 500, which has been produced and altered by the engineering department client 20E, the production department client 20P, and the service department client 20S, as described above. Based on this table 500, in the client 20 (which may be any of the engineering department client 20E, the production department client 20P, and the service department client 20S, or any other client 20), any department may be selected among the engineering department, the production department and the service department, and a part configuration diagram in the position of the selected department may be output as will be described below.

As shown in FIG. 5, each of the parts listed in the table is given at least any one of "E", "P" and "S" in the EPS section.

When predetermined operations are performed in the input unit 22 of the client 20 to designate a display mode (organizational form, mode, and organizational structure) of any of the engineering department, the production department, and the service department, the client 20 requests the server 11 through the network to output the data for displaying the part configuration diagram, which may be a tree diagram, corresponding the designated display mode.

In the server 11, the input/output control unit 13 generates the data for displaying the part configuration diagram based on the information stored in the database 10. For the data, the information of the parts given the EPS sections corresponding to the display mode of any of the engineering department, the production department, and the service department, as designated in the client 20, is extracted. For example, if the engineering department is designated in the client, the information of the parts given "E" in their EPS sections is extracted.

Then, since the part number of its parent part and the information of the level which the part belongs to are included in the information of each of the parts extracted, the data for displaying the part configuration diagram is generated in the client 20, based on the information.

The data generated in the input/output control unit 13 is sent from the communication unit 12 through the network to the client 20.

In the client 20 which received the data at the communication unit 21, the display unit 24 displays the part configuration diagram formed based on the data.

That is, from the above-described information of the parts extracted, with respect to the product corresponding to the level "0", the parts of the next level "1" are linked to be plotted. Next, the parts of the level "2", whose parent parts are the parts of the level "1" respectively, are linked to be plotted. Then, the part configuration diagram indicative of the part configuration of the product in a tree shape may be displayed in the display unit 24 by repeating such operations to the lower levels sequentially.

Figure 6:
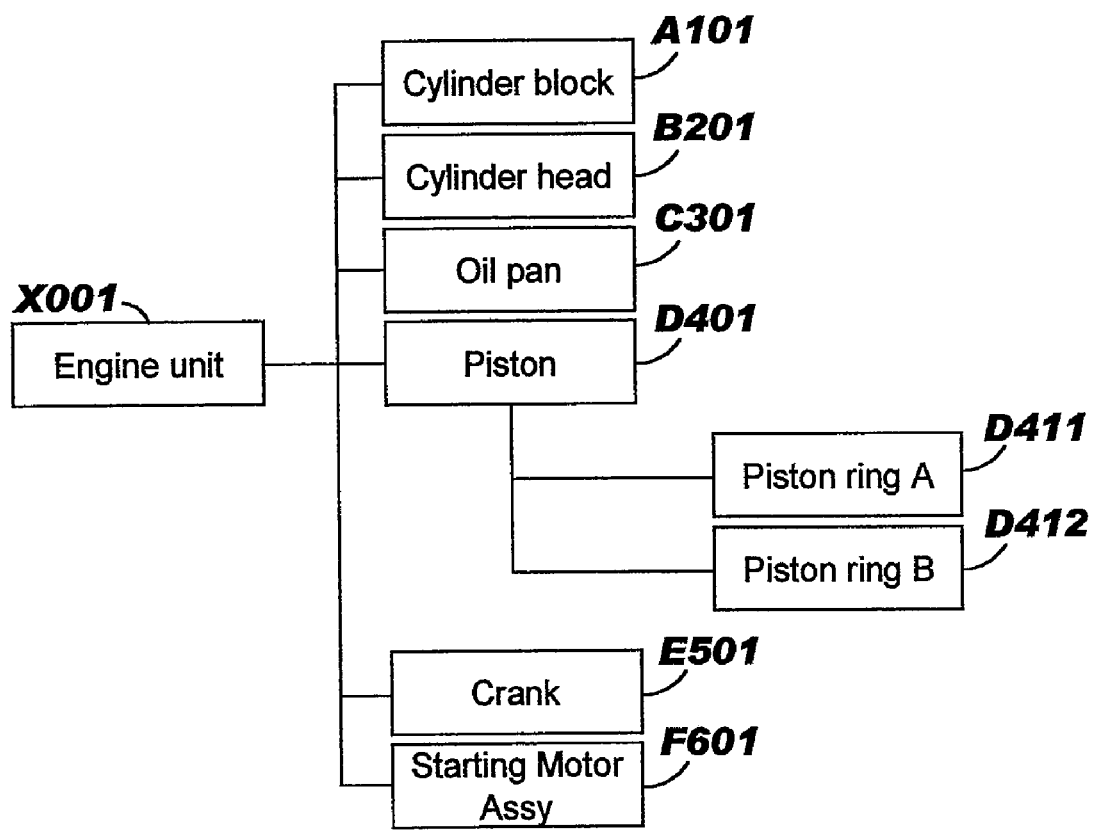
FIG. 6 shows an example of a part configuration diagram in the engineering department.
Figure 7:
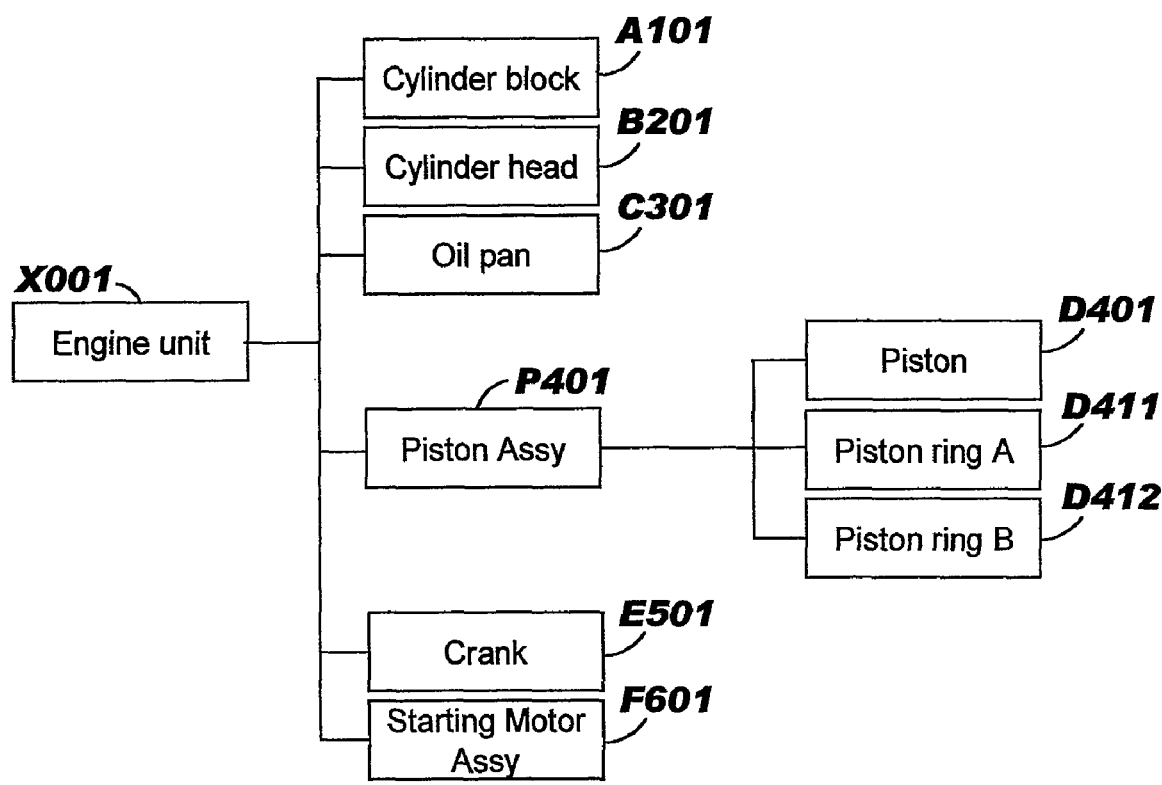
FIG. 7 shows an example of the part configuration diagram in the production department.
Figure 8:
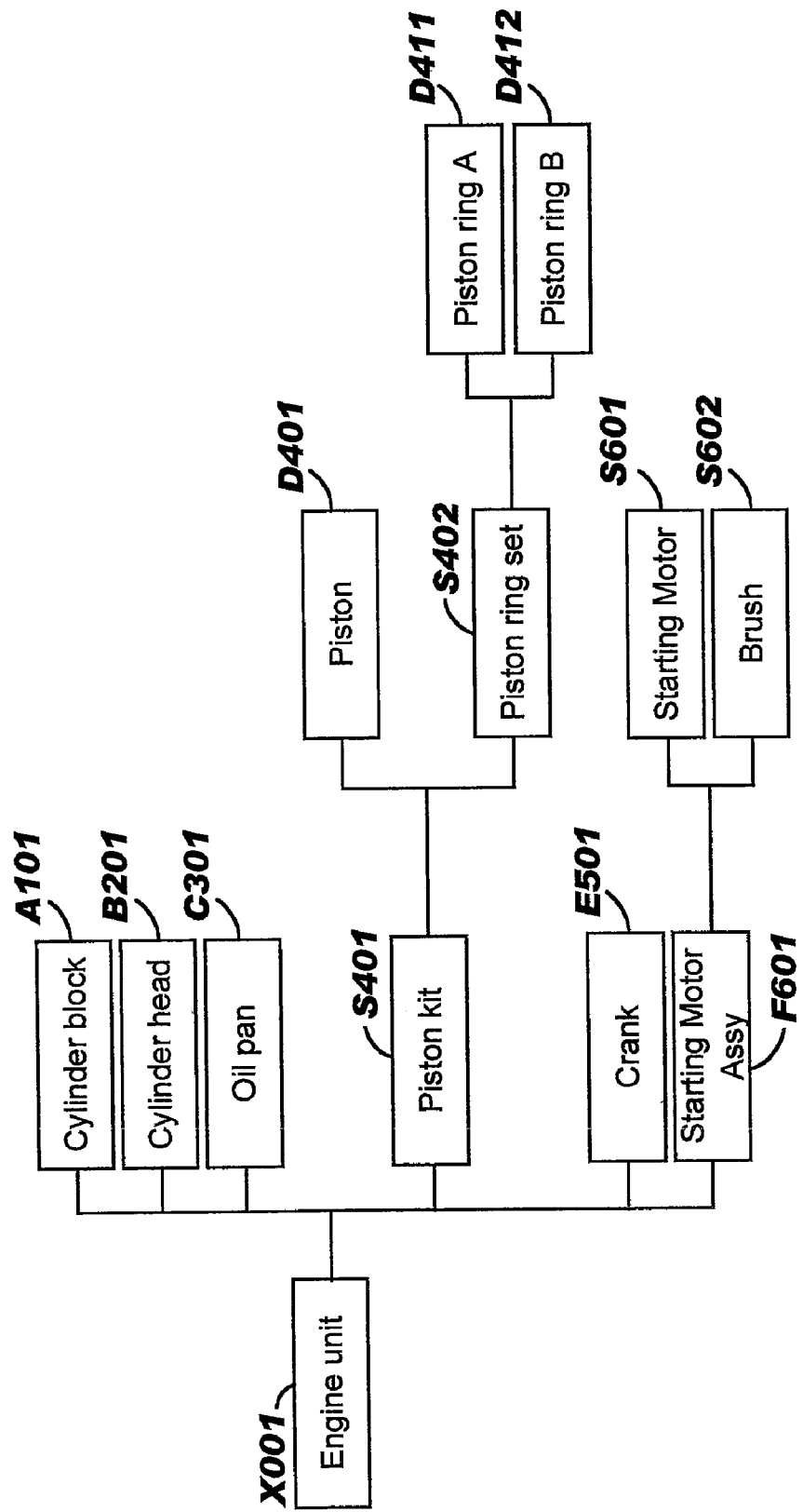
FIG. 8 shows an example of the part configuration diagram in the service department.

FIG. 6 through FIG. 8 show examples of the part configuration diagram displayed as described above. FIG. 6 shows an example of the part configuration diagram displayed on the display unit 24 when the engineering department is designated. The engine unit X001 is the product, and the cylinder block A101, the cylinder head B201, the oil pan C301, the piston D401, the crank E501 and the starting motor assembly F601, which are of the level "1", are linked to be displayed. Also, the piston D401, the piston ring A, D411, and the piston ring B, D412, which are of the level "2", are linked to be displayed.

FIG. 7 shows an example of the part configuration diagram displayed on the display unit 24 when the production department is designated, displayed by extracting the parts given "P" as the EPS sections from the table shown in FIG. 5. In the part configuration diagram, the engine unit X001 is the product, and the cylinder block A101, the cylinder head B201, the oil pan C301, the piston assembly P401, the crank E501 and the starting motor assembly F601, which are of the level "1", are linked to be displayed. Also, with respect to the piston assembly P401, the piston D401, the piston ring A, D411, and the piston ring B, D412, which constitute the piston assembly P401 and which are of the level "2", are linked to be displayed.

FIG. 8 shows an example of the part configuration diagram displayed on the display unit 24 when the service department is designated, displayed by extracting the parts given "S" as the EPS sections from the table shown in FIG. 5. In the part configuration diagram, the engine unit X001 is the product, and the cylinder block A101, the cylinder head B201, the oil pan C301, the piston kit S401, the crank E501 and the starting motor assembly F601, which are of the level "1", are linked to be displayed. Also, with respect to the piston kit S401, the piston D401 and the piston ring set S402, which constitute the piston kit S401 and which are of the level "2", are linked to be displayed. With respect to the piston ring set S402, the piston ring A, D411 and the piston ring B, D412, which are of the level "3", are linked to be displayed. Further, with respect to the starting motor assembly F601 of the level "1", the starting motor S601 and the brush S602, which constitute the starting motor assembly F601 and which are of the level "2", are linked to be displayed.

The engineering of the product is often altered midstream. Such an engineering alteration needs to be reflected in the tables. If a certain part constituting the product is altered in its engineering, it is important to manage the timing for switching between versions of the part before the engineering alteration and after the engineering alteration, particularly in the production department. Such timing information may be retained in the table in order to manage the product. Moreover, the timing of the parts switch is often shifted among the engineering department, the production department, and the service department, in terms of preparation for production of the parts, provision of the parts as service parts, and the like. Therefore, when the engineering is altered, the information of the parts-switch timing in each of the engineering department, the production department, and the service department is included in the table by entering it using the input unit 22 as alteration means. In this information, a period during which the pre-alteration parts are effective is set in a "To" field provided in the table, and a beginning timing of a period during which the post-alteration parts are effective is set in a "From" field. Moreover, based on a calendar function retained in the product structure information management system, and based on the information in the "To" field and the "From" field, a "State flag" is set for indicating whether each of the parts is effective or not at that time with "Effective" or "Ineffective".

FIG. 5 shows an example of the table including the information regarding such an engineering alteration. For example, if the piston ring A, D411, is altered, the piston ring A after the engineering alteration is given a new part number D413 and is added to the table. Then, the timing of the switch between the pre-alteration piston ring A, D411, and the post-alteration piston ring A, D413, is set with respect to each of the engineering department, the production department, and the service department. Though the part number differs before and after the engineering alteration in this example, it is possible to maintain the same part number without change and provide another field, such as version information and the like, to indicate the revision status.

In addition, the timings of the switch in the engineering department, the production department, and the service department may be changed together. It is also possible to alter the switch timings as necessary similarly to the above-mentioned input, addition, and alteration of the information in the table.

The example given in FIG. 5 shows a display state in which the hypothetical current date falls somewhere between Nov. 1, 2001 and Nov. 8, 2001. In this case, the switch timing date for the engineering department has passed. Consequently, the state flag for the piston ring A, D411, given "E" as the EPS section indicates "Ineffective", and the state flag for the piston ring A, D413, after the engineering alteration indicates "Effective". Furthermore, the hypothetical current date is before the switch times of the production department and the service department. Consequently, the state flags of the piston rings A, D411, given "P" and "S" as the EPS sections, indicate "Effective", and the piston rings A, D413, after the engineering alteration indicate "Ineffective".

In the product structure information management system as described above, once the information about all the parts constituting the product is first included in the table at the engineering stage, it is necessary only to add or alter the information when some of the parts are aggregated as the assembly or the set, to reflect the point of view of the production stage or the service stage. That is, it is not necessary to produce the table for part management individually at each of the engineering stage, the production stage, and the service stage; rather, it is necessary only to input the alteration. Therefore, efforts needed to effect the alteration may be significantly reduced, which speeds the development of the product or the engineering alteration. In addition, when the part is altered in its engineering stage, timing of the part switch may be reliably managed.

Furthermore, since the EPS section is set for each of the parts constituting the product, it is readily possible to obtain part configuration information, e.g., the part configuration diagram, necessary in the engineering department, the production department, and the service department.

Since each part is associated with hierarchical information indicative of its parent-child relation and information level, the part configuration diagram indicative of the part configuration of the product may be output as a tree.

Therefore, according to the above described product structure information management system, it is possible to centralize the management of the part configuration of the product. Although the above described exemplary embodiment shows the use of a host-client system, which comprises the server 11 and the clients 20, it is also possible to use a single PC to embody the invention. In this case, the data in the table (graph data) may be stored in storage means such as a hard disk drive in the PC.

Furthermore, although the exemplary embodiment described above is configured so that the information in the engineering department, the production department, and the service department is input at the engineering department client 20E, the production department client 20P, and the service department client 20S, respectively, it is also possible, for example at the engineering stage, for an engineer to input the information relevant to the production department and the service department. Furthermore, even if different operators in the engineering department, the production department, and the service department input the information, the engineering department client 20E, the production department client 20P, and the service department client 20S may actually be embodied as a single client.

Although the exemplary embodiment described above is configured so that the information is input in the engineering department, the production department, and the service department, and the part configuration diagram can be output, it is not so limited. For example, the production department may be further divided into a plurality of processes, and the information corresponding to each of the processes may also be included.

In addition, in the above described exemplary embodiment, the part number given to each of the parts is only an example; each of the parts may be given a part number according to rules set properly.

Further information may be included in the tables that are shown in FIG. 2 through FIG. 5. In addition, such a product structure information management system may be linked to an engineering system which provides engineering diagrams for the product or the parts, and so on. Moreover, the invention may be applied advantageously to any product comprising a plurality of parts, and is of course not limited to the case of automobile engines and automobile parts used in the foregoing illustrative examples.

A program for realizing the function of outputting the part configuration diagram may be in a form such as a recording medium or a program transmission device, as will be described below. That is, as the recording medium, the program as described above for causing a computer device to perform the inventive functions may be stored in the recording medium such as a CD-ROM, a DVD, a hard disk and the like, or any other memory, as readable by the computer device.

Furthermore, the program transmission device may be configured to include recording means having the program as described above recorded therein, such as a CD-ROM, a DVD, a hard disk, or any other memory and the like, and transfer means for transferring that program to the computer device through a connector or a network such as an intranet or the Internet, a LAN, and the like. Such a program transmission device is suitable for installation of the program for performing the inventive process as described above into the computer device.

I claim:

1. An information display device for displaying at least one chart pertaining to a product of an organization, said device comprising a first display unit adapted to display a first table depicting a plurality of parts of the product,
    wherein the organization comprises a plurality of departments;
    wherein the first table depicts a plurality of hierarchies;
    wherein each hierarchy comprises parts of the plurality of parts and describes hierarchical relationships among the parts of the plurality of parts;
    wherein each part appears in at least one hierarchy of the plurality of hierarchies; and
    wherein each department is uniquely associated with a corresponding entire hierarchy of the plurality of hierarchies;
    wherein being uniquely associated with an entire hierarchy means being uniquely associated with all parts and all hierarchical relationships comprised by the entire hierarchy;
    wherein the corresponding entire hierarchy to which each department is uniquely associated is department specific such that no other department of the plurality of departments is associated with the corresponding entire hierarchy;
    wherein each corresponding entire hierarchy comprises level numbers denoting hierarchical levels in each corresponding entire hierarchy; and
    wherein each part has an associated level number that is specific to each corresponding entire hierarchy in which each part appears, as depicted in the first table.

2. The information display device of claim 1,
    wherein the first table comprises a plurality of rows and a plurality of columns;
    wherein the plurality of columns comprise a Part Number column; and
    wherein each part has an associated part number that is denoted in at least one row in the Part Number column.

3. The information display device of claim 2,
    wherein each part is a child of a parent part that is specific to each hierarchy in which each part appears, subject to each parent part being either the product or a part of the plurality of parts, as depicted in the first table;
    wherein the plurality of columns further comprise a Parent Part column; and
    wherein for each row in which a part is denoted in the Part Number column, the denoted part number has its parent part denoted in the Parent Part column.

4. The information display device of claim 3,
    wherein the plurality of columns further comprise a Level column; and
    wherein for each row in which a part is denoted in the Part Number column, the denoted part number has its associated level number denoted in the Level column.

5. The information display device of claim 4,
    wherein a first row of the plurality of rows denotes a first part in the Part Number column and a first level number in the Level column;
    wherein a second row of the plurality of rows denotes the first part in the Part Number column and a second level number in the Level column; and
    wherein the second level number differs from the first level number.

6. The information display device of claim 3,
    wherein the plurality of columns further comprise an EPS Section column; and
    wherein for each row in which a part number is denoted in the Part Number column, the denoted part number is used by each department of at least one department denoted in the EPS Section column such that the level number to which the denoted part number is associated in each row is specific to each denoted department in the EPS Section column.

7. The information display device of claim 6,
    wherein the first display unit is adapted utilize the first table to display a distinct logical tree image of each corresponding entire hierarchy to which an individual department is uniquely associated, by extracting said each corresponding entire hierarchy from the first table; and
    wherein the rows of the first table utilized by the first display unit to display each distinct logical tree image consist of only those rows of the first table in which the department uniquely associated with the corresponding entire hierarchy pertaining to said each distinct logical tree image is depicted in the EPS Section column.

8. The information display device of claim 6,
    wherein the first display unit adapted to display a second table after displaying the first table;
    wherein the second table comprises the first table subject to at least one modification of the first table; and
    wherein the at least one modification of the first table comprises a new part added to the plurality of parts, such that the new part does not appear in the first table, such that the new part is a parent part to a first part of the plurality of parts, such that the first part appears in the Part Number column of a first row in the first table, such that the new part is used by a first department depicted in the EPS Section column in the first row of the first table, such that the first department does not appear in the EPS Section column in the first row of the second table, such that the new part appears in the Part Number column of a second row in the second table, and such that the first department appears in the EPS Section column in the second row of the second table.

9. The information display device of claim 6, wherein a first row of the plurality of rows denotes a first part in the Part Number column, a first department in the EPS Section column, and a second department in the EPS Section column such that the second department differs from the first department.

10. The information display device of claim 6, wherein a first row of the plurality of rows denotes all departments of the plurality of departments in the EPS Section column.

11. The information display device of claim 6, wherein each row of the plurality of rows denotes all departments of the plurality of departments in the EPS Section column.

12. The information display device of claim 1, wherein the plurality of departments comprises an engineering department, a production department, and a service department.

13. The information display device of claim 1, wherein the plurality of departments consists of an engineering department, a production department, and a service department.

14. The information display device of claim 1, wherein a client of a first department of the plurality of departments comprises the first display unit, and wherein the first display unit is coupled to a database by a server, and wherein the database comprises the first table.

15. The information display device of claim 14, wherein a client of a second department of the plurality of departments comprises a second display unit, wherein the second display unit is adapted to display the first table in the same manner as the first display unit, and wherein the second display unit is coupled to the database by the server.

16. A computer-readable recording medium comprising a computer program utilized by the first display unit to display the first table according to claim 1.

17. A server comprising a communication unit adapted to communicate with the information display device of claim 1, wherein the first display unit is coupled to a database by the server, and wherein the database comprises the first table.

18. The information display device of claim 1, wherein the first display unit is adapted utilize the first table to display a distinct logical tree image of each corresponding entire hierarchy to which an individual department is uniquely associated, by extracting said each corresponding entire hierarchy from the first table.

19. The information display device of claim 2,
wherein the first display unit is adapted utilize the first table to display a distinct logical tree image of each corresponding entire hierarchy to which an individual department is uniquely associated, by extracting said each corresponding entire hierarchy from the first table; and
wherein the rows of the first table utilized by the first display unit to display each distinct logical tree image consist of only those rows of the first table in which the department uniquely associated with the corresponding entire hierarchy pertaining to said each distinct logical tree image is depicted in the EPS Section column.

20. The information display device of claim 2,
wherein the plurality of columns further comprise an EPS Section column; and
wherein for each row in which a part number is denoted in the Part Number column, the denoted part number is used by each department of at least one department denoted in the EPS Section column such that the level number to which the denoted part number is associated in each row is specific to each denoted department in the EPS Section column.

\* \* \* \* \*